United States Patent
Lee et al.

(10) Patent No.: US 9,331,873 B2
(45) Date of Patent: May 3, 2016

(54) APPARATUS AND METHOD FOR CONTROLLING DATA INTERFACE

(71) Applicant: LG DISPLAY CO., LTD., Seoul (KR)

(72) Inventors: Songjae Lee, Gimpo-si (KR); Yangseok Jeong, Paju-si (KR); Kukhui Chang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 239 days.

(21) Appl. No.: 14/081,616

(22) Filed: Nov. 15, 2013

(65) Prior Publication Data

US 2014/0173360 A1 Jun. 19, 2014

(30) Foreign Application Priority Data

Dec. 14, 2012 (KR) .......................... 10-2012-0146602

(51) Int. Cl.
| | | |
|---|---|---|
| G06F 11/00 | (2006.01) | |
| H04L 25/02 | (2006.01) | |
| G06F 11/30 | (2006.01) | |
| G06F 13/40 | (2006.01) | |

(52) U.S. Cl.
CPC ........ *H04L 25/0272* (2013.01); *G06F 11/3041* (2013.01); *H04L 25/0292* (2013.01); *G06F 13/4072* (2013.01)

(58) Field of Classification Search
CPC ............ G06F 11/0754; G06F 11/3041; G06F 11/3027; G06F 11/349; G06F 11/3485; G06F 11/0103; G06F 13/4072
See application file for complete search history.

(56) References Cited

U.S. PATENT DOCUMENTS

| | | | | |
|---|---|---|---|---|
| 6,011,821 A * | 1/2000 | Sauer | ................ | G06F 13/4286 370/520 |
| 7,791,579 B2 * | 9/2010 | Choi | .................. | G09G 3/3611 345/213 |
| 8,610,656 B2 * | 12/2013 | Ko | ..................... | G09G 3/3688 345/100 |
| 2004/0223542 A1 * | 11/2004 | Radjassamy | ........... | G06F 1/24 375/229 |
| 2008/0005377 A1 * | 1/2008 | Lambert | ............... | G06F 1/266 710/15 |
| 2010/0149083 A1 * | 6/2010 | Park | ................... | G09G 3/3611 345/99 |
| 2011/0032421 A1 * | 2/2011 | Kota | ..................... | G09G 5/18 348/500 |
| 2011/0078355 A1 * | 3/2011 | Tan | ..................... | H04B 1/0007 710/305 |
| 2011/0096079 A1 * | 4/2011 | Carter | ................. | G06F 1/3265 345/520 |
| 2011/0254825 A1 * | 10/2011 | Peng | .................. | G09G 3/3648 345/212 |
| 2011/0292011 A1 * | 12/2011 | Lee | .................... | G09G 3/3611 345/208 |
| 2011/0292020 A1 * | 12/2011 | Lee | .................... | G09G 3/3688 345/211 |

FOREIGN PATENT DOCUMENTS

| | | |
|---|---|---|
| CN | 1815404 A | 8/2006 |
| CN | 202307087 U | 7/2012 |

* cited by examiner

*Primary Examiner* — Yolanda L Wilson
(74) *Attorney, Agent, or Firm* — Dentons US LLP

(57) ABSTRACT

Disclosed is an apparatus and a method for controlling data interface. The apparatus for controlling data interface comprises: a transmitting terminal outputting signal including a CDR (Clock Data Recovery) training signal, an align training signal and display data sequentially; a receiving terminal inputting the signals from the transmitting terminal; and a Rx monitoring device detecting an abnormal status of the receiving terminal by monitoring an input timing signal and an operating status of the receiving terminal, and resetting the receiving terminal when the receiving terminal operates abnormally.

4 Claims, 3 Drawing Sheets

APPARATUS AND METHOD FOR CONTROLLING DATA INTERFACE

CROSS-REFERENCE TO RELATED APPLICATION

This application claims priority to Korea Patent Application No. 10-2012-0146602 filed on Dec. 14, 2012, which is incorporated by reference herein in its entirety for all purposes.

BACKGROUND OF THE INVENTION

1. Field of the Invention

The present disclosure relates to an apparatus and a method for controlling data interface.

2. Discussion of the Related Art

A low-voltage differential signaling (LVDS) interface has been used as an interface for data transmission in most liquid crystal displays. However, the LVDS interface cannot properly cope with an increase in the amount of data resulting from a double speed drive or a quad-speed drive for a high resolution, color depth extension, response time improvement of the liquid crystal displays. When the LVDS interface is adapted to a 120 Hz Full HD (1920×1080) panel of 10-bit color depth, 24 pairs of lines, i.e., 48 lines total, are required. The LVDS interface is used to transmit clock signals as well as the data. Thus, as the amount of data to be transmitted increases, a frequency of the clock signal of the LVDS interface also increases. Hence, electromagnetic interference (EMI) has to be controlled.

According to a standard of the LVDS interface, the LVDS interface transmits signals changing around a voltage of 1.2V to ground. A standard of a signal voltage required in the LVDS interface took a large limit to a design of large scale integration (LSI) because of the achievement of a fine process of the LSI. In this situation, an interface such as a digital video interface (DVI), a high definition multimedia interface (HDMI), DisplayPort was proposed and was put to practical use.

The DVI and the HDMI each have a skew adjustment function, and high-bandwidth digital content protection (HDCP) may be embedded in HDMI as a content protection function. Therefore, the DVI and the HDMI have a great advantage in the transmission of an image signal between devices. However, in addition to licensing cost, DVI and HDMI require substantial power consumption and have excessive functions for the transmission of the image signal between the devices.

DisplayPort interface was standardized as a specification capable of replacing the LVDS interface in video electronics standards association (VESA). The DisplayPort (DP) interface can monitor the operating condition of the receiving terminal (Rx) at the transmitting terminal (Tx) via the auxiliary (AUX) channel. Because the HDCP is embedded in DisplayPort (DP) interface in consideration of transmission of protected content between the devices in the same manner as the HDMI, DisplayPort (DP) interface also has excessive functions and requires substantial power consumption. Further, when DisplayPort performs the signal transmission at a low frequency, a loss is generated in DisplayPort because a transmission speed of the DisplayPort is fixed. Thus, a receiving terminal of the DisplayPort has to reproduce clock signals.

V-by-One interface was developed by THine Electronics, Inc. The V-by-One interface has better signal transmission quality than the existing LVDS interface due to the introduction of an equalizer function and has also realized 3.75 Gbps per 1 Pair. Further, the V-by-One interface solved the problem of the skew adjustment generated in the clock transmission of the LVDS interface because the transmitting terminal (Vx1 Tx) does not send clocks due to the adoption of clock data recovery (CDR). Because the V-by-One interface does not have the clock transmission function required in the existing LVDS interface, an EMI noise resulting from the clock transmission may be reduced. Because the V-by-One interface can efficiently cope with an increase in an amount of data and the higher speed drive, the V-by-One interface is drawing attention as an alternative technology of the existing LVDS interface.

However, the V-by-one interface can not monitor the operating status/conditions of the receiving terminal (Vx1 Rx) at the transmitting terminal (Vx1 Tx). Therefore, under abnormal conditions such as the electro static discharge (ESD), the CDR lock can be occurred at the receiving terminal (Vx1 Rx) abnormally. Consequently, as this abnormal condition of the receiving terminal can not be detected at the transmitting terminal, the operating status/conditions between the transmitting terminal and the receiving terminal are not synchronized, so that it is very hard to solve the problems in which the data sent from the transmitting terminal may be missed at the receiving terminal.

SUMMARY OF THE INVENTION

Accordingly, the present invention is directed to an apparatus and a method for controlling data interface monitoring the operating status of the receiving terminal at the transmitting terminal.

In order to accomplish the above purpose, one embodiment of the present disclosure suggests an apparatus for controlling data interface comprising: a transmitting terminal outputting signals including a CDR (Clock Data Recovery) training signal, an align training signal and display data sequentially; a receiving terminal inputting the signals from the transmitting terminal; and a Rx monitoring device detecting an abnormal status of the receiving terminal by monitoring an input signal timing and an operating status of the receiving terminal, and resetting the receiving terminal when the receiving terminal operates abnormally.

The present disclosure may suggest a method for controlling data interface comprising: transmitting a CDR (Clock Data Recovery) training signal, an align training signal and display data from a transmitting terminal to a receiving terminal, sequentially; monitoring an input signal timing and an operating status of the receiving terminal using a Rx monitoring device; and detecting an abnormal status of the receiving terminal, and resetting the receiving terminal when the receiving terminal operates abnormally.

By monitoring the input signal timing of the receiving terminal and the operating status/condition of the receiving terminal, when the receiving terminal works abnormally, the receiving terminal can be reset. Therefore, according to the present disclosure, the V-by-one interface can be returned to the normal status even if the receiving terminal has any problems (i.e., abnormal operation), by monitoring the operating status of the receiving terminal at the transmitting terminal of the V-by-One interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incor

DETAILED DESCRIPTION OF THE ILLUSTRATED EMBODIMENTS

Figure 1:
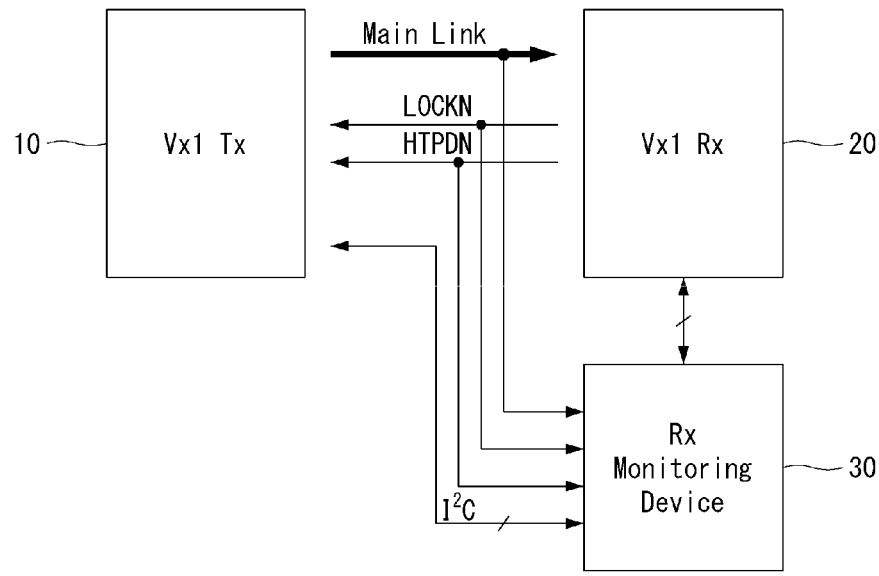
- FIG. 1 illustrates an interface device according to an exemplary embodiment of the present disclosure.

Referring to attached figures, embodiments of the present disclosure will be described. Like reference numerals designate like elements throughout the detailed description. However, the present disclosure is not restricted by these embodiments but can be applied to various changes or modifications without changing the technical spirit. In the following embodiments, the names of the elements are selected for ease of explanation and may be different from actual names.

Figure 2:
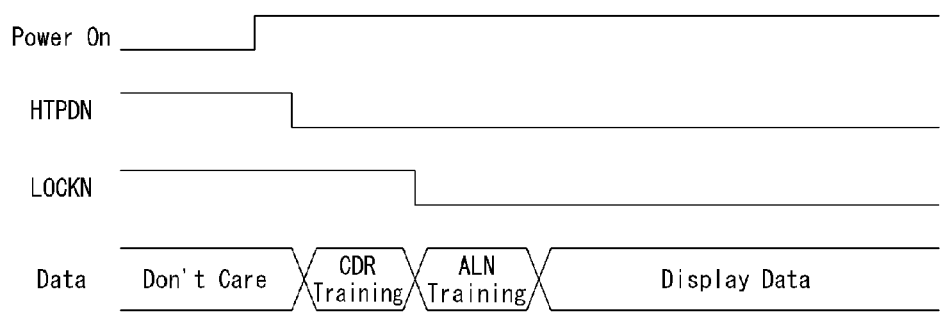
FIG. 2 is a waveform diagram illustrating a sequence of V-by-One interface.

Referring to FIGS. 1 and 2, an interface device according to an exemplary embodiment of the invention includes a transmitting terminal 10 (Vx1 Tx), a receiving terminal 20 (Vx1 Rx) and a Rx monitoring device 30. The embodiment of the invention is described using a V-by-One interface as an example of the interface device, but is not limited thereto.

Auxiliary signal transmission links used in the transmission of auxiliary signals LOCKN and HTPDN as well as a number of main links used in data transmission couple the transmitting terminal 10 and the receiving terminal 20, so as to implement a data communication using the V-by-One interface.

Just after the power of the display turns on, the receiving terminal 20 checks the connection with the transmitting terminal 10, and then pulls the HTPDN signal to a low level. In response to the HTPDN signal of the low level at the receiving terminal 20, in accordance with the V-by-one interface protocol, as shown in FIG. 2, the transmitting terminal 10 outputs the CDR training signal, and then the transmitting terminal 10 outputs the align training signal and the display data when the receiving terminal 20 reduces the LOCKN signal. According to the V-by-one interface protocol, any clocks are not sent between the transmitting terminal 10 and the receiving terminal 20. The transmitting terminal 10 is connected to the Rx monitoring device 30 via a serial interface. This serial interface may be selected from any one of I²C interface or USB (Universal Serial Bus) and so on. In most displays, the I²C interface may connect between the host system and the timing controller. Therefore, it is not required to add any new serial interface for the serial interface between the transmitting terminal 10 and the Rx monitoring device 30. The I²C interface between the host system and the timing controller can be used for the serial interface between the transmitting terminal 10 and the Rx monitoring device 30.

The transmitting terminal 10 can receive the operating status/conditions of the receiving terminal 20 from the Rx monitoring device 30. In addition, the transmitting terminal 10 can receive the signal for changing the equalizer EQ setup value when the operation of the receiving terminal 20 is in abnormal status/condition. In response to the signal for changing the equalizer EQ setup value, the transmitting terminal 10 can change the amplifying ratio of the signal sent to the receiving terminal 20.

The Rx monitoring device 30 is connected to the input channels and the output channels of the receiving terminal 20. The Rx monitoring device 30 is connected to the transmitting terminal 10 via the serial interface. The Rx monitor device 30 detects whether the receiving terminal 20 has problems or not by comparing the input timing of the receiving terminal 20 and monitoring the operating status of the receiving terminal 20. When the receiving terminal 20 has any problem, the Rx monitor device 30 may reset the receiving terminal 20. After being reset by the Rx monitoring device 30, the receiving terminal 20 changes the LOCKN to the high logic level to make the transmitting terminal 10 re-send the signals from the last CDR training signal. Further, when the receiving terminal 10 operates abnormally, the Rx monitoring device 30 may send the equalizer EQ setup changing signal to the transmitting terminal 10 via the serial interface to change to amplifying ratio of the signal output from the transmitting terminal 10. In responding to the equalizer EQ setup changing signal from the Rx monitoring device 30, the transmitting terminal 10 can increase the amplifying ratio of the signals.

The abnormal operating status/condition at the receiving terminal 20 may be caused in various results by various reasons. For one example, within the align training signal transmitting period, the transmitting terminal 10 sends the 1920 data enable signals to the receiving terminal 20. The receiving terminal 20 may recognize only the 1900 data enable signals. For another example, after the align training signal transmitting period, the transmitting terminal 10 sends the display data for representing on the display panel. The receiving terminal 20 may be still in align training status so that it does not conduct the sampling process to the display data.

Figure 3:
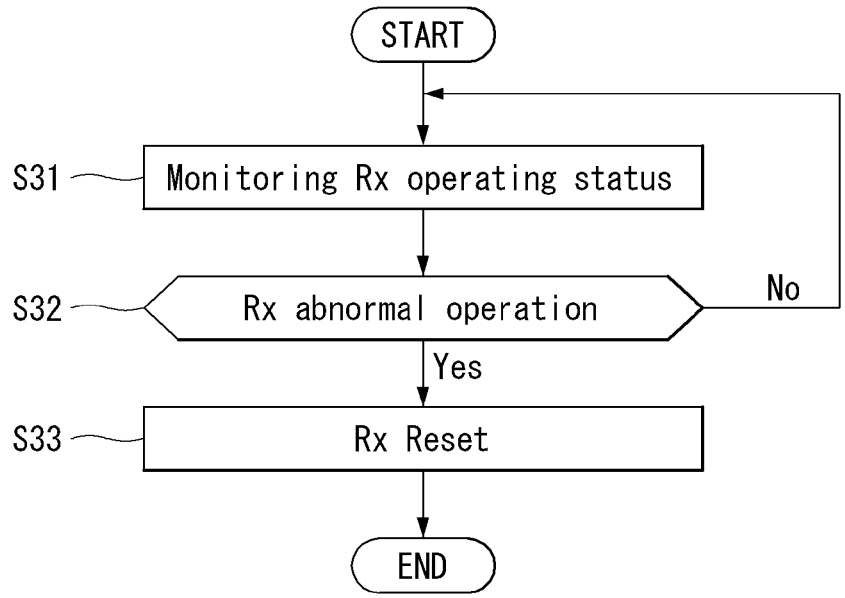
FIGS. 3 and 4 are flow charts illustrating a method for controlling data interface according to an exemplary embodiment of the present disclosure.
Figure 4:
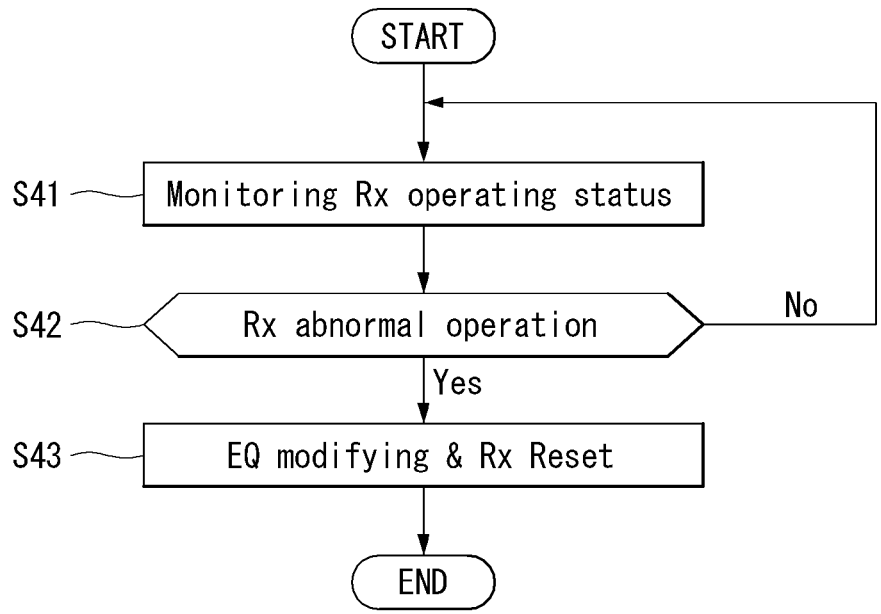

FIGS. 3 and 4 are flow charts illustrating a method for controlling data interface according to an exemplary embodiment of the present disclosure.

Referring to FIGS. 3 and 4, the Rx monitoring device 30 may reset the receiving terminal 20 when it decides that the receiving terminal 20 is working abnormally (including 'malfunction', 'mis-counting data clocks', 'problems', 'failures', 'errors' and so on) by monitoring the receiving terminal 20 (S31 to S33). The receiving terminal 20 is reset by the Rx monitoring device 30, so that the LOCKN signal is changed to the high logic level, as shown in FIG. 2. Then, the receiving terminal 20 may again receive the CDR training signal, the align training signal and the display data sequentially.

The Rx monitoring device 30 may reset the receiving terminal 20 and send the equalizer EQ setup changing signal to the receiving terminal 10 via the serial interface, when it decides that the receiving terminal 20 is working abnormally (S41 to S43). The receiving terminal 20 is reset by the Rx monitoring device 30, so that the LOCKN signal is changed to the high logic level, as shown in FIG. 2. Then, the receiving terminal 20 may receives again the CDR training signal, the align training signal and the display data sequentially. In responding to the equalizer EQ setup changing signal from the Rx monitoring device 30, the transmitting terminal 10 may change the amplifying ratio of the signal which will be sent to the receiving terminal 20.

The system according to the present disclosure may be applied to any type of flat panel display including a liquid crystal display ('LCD'), a field emission display ('FED'), an organic light emitting display ('OLED'), an electrophoresis display ('EPD'), etc.

Figure 5:
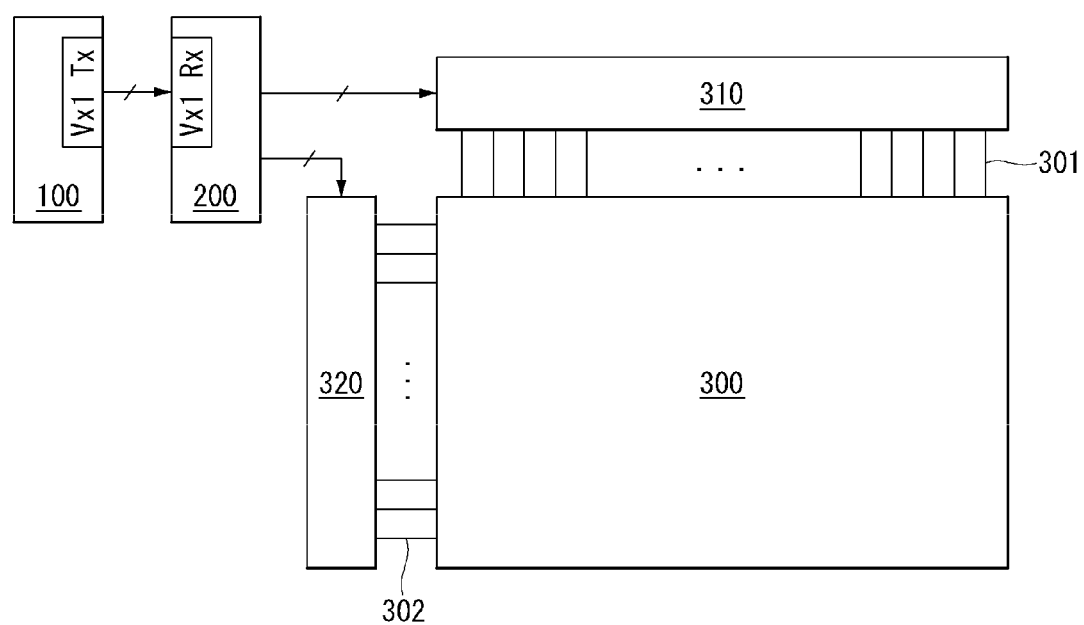
FIG. 5 is a block diagram of a display device according to an exemplary embodiment of the present disclosure.

Referring to FIG. 5, the display according to the present disclosure may comprise a display panel 300, panel driving circuits 310 and 320, and a timing controller 200.

The pixel array of the display panel 300 may include a plurality of pixel areas defined by the data lines 301 and the scan lines 302, and represent the video data.

The panel driving circuit may write the video data to the display panel 300 by the timing controller 200. The panel driving circuit may include the data driving circuit 310 and the scan driving circuit 320. The data driving circuit 310 generates the analog data signals by modulating the pixel data (digital data) received from the timing controller 200 with the gamma compensating voltage, and supplies the data signals to the data line 301. The scan driving circuit 320 supplies the scan signal synchronized to the data signals to the scan lines 302 sequentially.

The timing controller 200 transmits the pixel data received through the receiving terminal Vx1 Rx to the data driving circuit 310 and controls operation timings of the data driving circuit 310 and the scan driving circuit 320 using the timing data received through the receiving terminal Vx1 Rx. The timing controller 200 detects the operating status of the receiving terminal Vx1 Rx using the Rx monitoring device 30 to control the interface as shown in FIGS. 3 and 4. The receiving terminal Vx1 Rx and the Rx monitoring device 30 may be embedded into the timing controller 200.

The transmitting terminal Vx1 Tx may be disposed at the host computer 100 to send the pixel data, the timing data and the control data to the receiving terminal Vx1 Rx. The transmitting terminal Vx1 Tx may be embedded into the host computer 100. The host computer 100 may be any one type including a television set, a set-top box, a navigation system, a DVD player, a Blue-Ray player, a personal computer, a home theater system or a phone system. Including the SoC (System on Chip) embedding the system scaler, the host system 100 may converts the digital video data (RGB) to any format proper to representing the video data on the display panel 300. The host computer 100 may send the timing signals (including Vsync, Hsync, DE, MCLK and so on) with the digital video data to the timing controller 200.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. An apparatus for controlling data interface, comprising:
a receiving terminal receiving signals including a CDR (Clock Data Recovery) training signal, an align training signal and display data sequentially from a transmitting terminal; and
a Rx monitoring device detecting an abnormal status of the receiving terminal by monitoring an input signal timing and an operating status of the receiving terminal, and resetting the receiving terminal when the receiving terminal operates abnormally,
wherein the Rx monitoring device sends an equalizer setup changing signal to the transmitting terminal when the receiving terminal operates abnormally and the receiving terminal receives signals an amplifying ration of which is changed by the transmitting terminal in response to the equalizer setup changing signal.

2. The apparatus according to the claim 1, wherein the Rx monitoring device is connected to the transmitting terminal via a serial interface.

3. The apparatus according to the claim 1, wherein the Rx monitoring device and the receiving terminal are embedded in a timing controller; and
wherein the timing controller controls a panel driving circuit writing video data on a display panel.

4. A method for controlling data interface, comprising:
monitoring an input timing signal and an operating status of a receiving terminal when the receiving terminal sequentially receives a CDR (Clock Data Recovery) training signal, an align training signal and display data from a transmitting terminal; and
detecting an abnormal status of the receiving terminal, and resetting the receiving terminal when the receiving terminal operates abnormally,
wherein the method further comprises:
sending an equalizer setup changing signal to the transmitting terminal when the receiving terminal operates abnormally so that the transmitting terminal changes an amplifying ration of signals sent to the receiving terminal in response to the equalizer setup changing signal.

* * * * *